United States Patent [19]

Schmidt et al.

[11] 4,129,741
[45] Dec. 12, 1978

[54] NOVEL POLYETHERS HAVING TERMINAL AMINO GROUPS, A PROCESS FOR THEIR PRODUCTION AND THEIR APPLICATION

[75] Inventors: Oskar Schmidt, Kittsee; Walter Sibral, Tulln, both of Austria

[73] Assignee: Lim-Holding, S.A., Luxembourg

[21] Appl. No.: 735,291

[22] Filed: Oct. 26, 1976

[30] Foreign Application Priority Data

Oct. 27, 1975 [AT] Austria .................................. 8155/75
Oct. 27, 1975 [AT] Austria .................................. 8156/75

[51] Int. Cl.² .................... C07C 101/54; C08G 18/02
[52] U.S. Cl. .................... 560/50; 260/455 R;
528/211; 528/68; 528/67
[58] Field of Search ................... 500/50; 260/455 R

[56] References Cited

U.S. PATENT DOCUMENTS

| | | | |
|---|---|---|---|
| 3,402,194 | 9/1968 | Schleppnik | 260/455 R |
| 3,719,692 | 3/1973 | Havinga et al. | 560/50 |
| 3,808,250 | 4/1974 | Blahak et al. | 560/50 |
| 3,929,863 | 12/1975 | Blahak et al. | 560/50 |
| 3,993,627 | 11/1976 | Sekmakas et al. | 260/77.5 CR |
| 4,007,239 | 2/1977 | Blahak et al. | 260/455 R |

*Primary Examiner*—James O. Thomas, Jr.
*Assistant Examiner*—G. T. Breitenstein

*Attorney, Agent, or Firm*—Beveridge, DeGrandi, Kline & Lunsford

[57] ABSTRACT

Compounds having terminal amino groups and being of the general formula

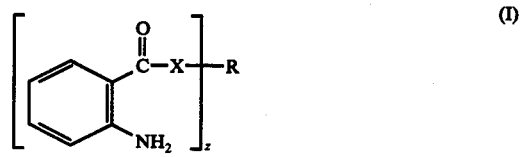

wherein z is an integer of 2 to 4, X is oxygen or sulfur and R is a group of the formula

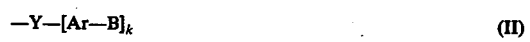

wherein k is an integer of 1 to 4,
  Ar is aromatic,
  when k = 1, Y is B and when k = 2 to 4 then Y is an akylidene group having 1 to 5 carbon atoms,
  B represents divalent polyalkylene ether or polyalkylene thioether such as it is obtained by removal of the hydroxyl or mercapto groups from a polyalkylene ether diol or a polyalkylene thioether dithiol of a molecular weight of about 100 to 15,000. The compounds are useful to prepare polyureas.

20 Claims, No Drawings

NOVEL POLYETHERS HAVING TERMINAL AMINO GROUPS, A PROCESS FOR THEIR PRODUCTION AND THEIR APPLICATION

The invention relates to novel polyamines, their production and their use in the production of polyureas of increased thermal stability and improved tensile and structural strength.

It is known that polyureas possess a number of considerable advantages over polyurethanes of corresponding structure. Polyureas are obtained by reaction of polyisocyanates with polyamines. Suitable polyamines are particularly polyether polyamines of higher molecular weight.

According to German Offenlegungsschrift No. 2,019,432, polyamines suitable for the production of such polyureas are obtained from aliphatic polyether polyols and isatic acid anhydride.

It was found that the use of polyether polyamines having one or several aromatic nuclei (rings) in their molecule (center) leads to the obtention of polyureas which are far superior to those known in respect to thermal stability and tensile and structural strength.

The invention relates to novel compounds having terminal amino groups, said novel compounds being of the general formula

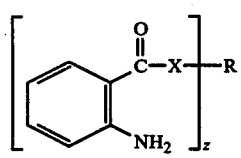  (I)

wherein z is an integer of 2 to 4, X is oxygen or sulfur and R is a group of the formula

   —Y—[Ar-B]$_k$   (II)

wherein k stands for an integer of 1 to 4, Ar is an aromatic group, Y when k = 1 is B and when k = 2 to 4 is an alkylidene group having 1 to 5 carbon atoms and B represents a divalent polyalkylene ether group or polyalkylene thioether group such as it is obtained by removing the hydroxyl or mercapto groups from a polyalkylene ether diol or a polyalkylene thioether dithiol of a molecular weight of about 100 to 15000, in particular of about 500 to 3000.

A further object of the invention is the production of the novel compounds of the formula I. It can be effected by heating of a polyether polyol or a polythioether polythiol of the formula III

   R(HX)$_z$   (III)

wherein R and X have the meanings defined above and z is an integer of 2 to 4, with at least two equivalents of isatoic acid anhydride in the presence of strong bases to temperatures of 30° to 150° C., preferably of 45° to 130° C. The reaction can be carried out with or without the presence of inert solvents. The amount of catalyst used can be varied within a wide range. Preferably, 1 to 10 parts by weight of the alkaline compound per 100 parts by weight of isatoic acid anhydride are used. The reaction is completed as soon as gas development ceases. The catalyst and excess isatic acid anhydride are filtered off, optionally after addition of an inert solvent, and the final product is obtained with a high degree of purity after treatment with $CO_2$, shaking with water and drying in vacuo under stirring. For the majority of application purposes, simple filtration of the amino polyether suffices.

Suitable starting materials for the process according to the invention are polyols and polythiols of the formula III of a molecular weight of about 300 to 15000, preferably of about 400 to 10000 and in particular of about 500 to 3000, comprising polyether polyols and polyether polythiols or as well polyether segments or polythioether segments.

Preferred in the process according to the invention is the use of polymerisates obtained by the reaction of ethylene oxide, propylene oxide or other 1,2-alkylene oxides with a compound corresponding to R in the formula II wherein B = OH, $CH_2OH$, $OCH_2—CH_2—OH$ or $CH_2CH(CH_3)OH$. Such compounds are produced according to generally known processes as disclosed in U.S. Pat. No. 2,652,419.

Preferred are compounds, or is the production of compounds, of the formula I wherein Ar represents a p-phenylene group, further such compounds wherein Ar stands for a diphenyl alkane group.

Of these groups, the diphenyl propane (Bisphenol A) group is preferred.

In view of the multitude of application possibilities, compounds of the formula I, or their production, are (is) preferred wherein B represents a polyethylene ether group, a polypropylene ether group or polyalkylene ether group containing ethylene ether groups and propylene ether groups in any given sequence.

B can further represent a group containing ether groups as well as thioether groups.

In view of the inexpensive obtention of the starting materials, it is further preferred to use compounds of the formula I, or to produce such compounds, wherein B stands for a polyalkylene ether group derived from tetrahydrofurane or a polyalkylene ether group containing ethylene ether groups and alkylene ether groups derived from tetrahydrofurane in any given sequence, or for a polyalkylene ether group containing alkylene ether groups derived from tetrahydrofurane and propylene ether groups, in any given sequence.

Typical examples of the novel compounds having terminal amino groups according to the invention or obtainable according to the invention, said compounds having the formula I, are the following:

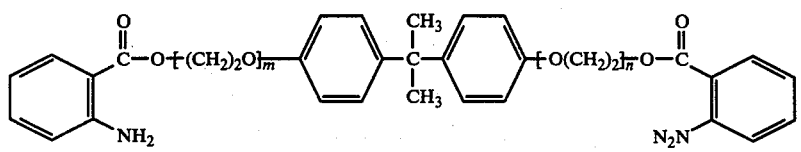   (1)

-continued

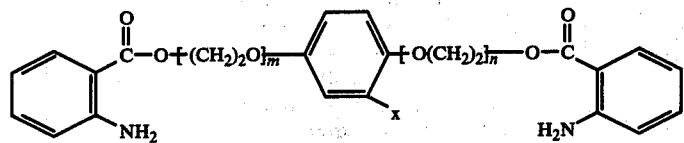
(2)

x = H, Halogen, CH₃

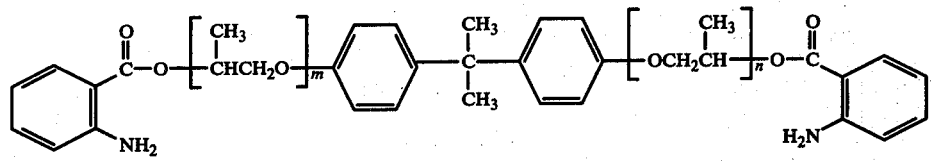
(3)

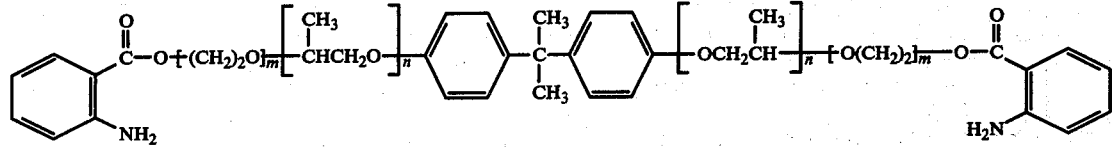
(4)

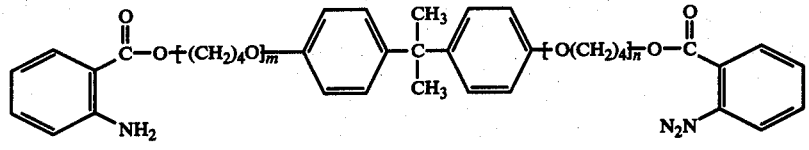
(5)

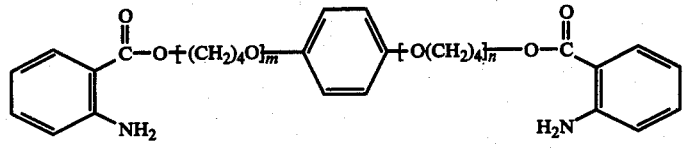
(6)

In these formulae, the indices m and n in each case represent such integers that molecular weights of about 100 to 15000, in particular of 500 to 3000, result in the compounds obtained. A further object of the invention is the application of the new compounds of the formula I as reactants with polyisocyanates in the production of plastic materials according to the isocyanate polyaddition process.

The production of plastic materials from the compounds according to the invention or obtainable according to the invention according to the isocyanate polyaddition process can be effected in any manner known in polyurethane chemistry, i.e. for the reaction of polyhydroxyl compounds with polyisocyanates. This means that the reaction of the new compounds with polyisocyanates can be carried out in the presence of all the additives known in polyurethane chemistry, such as catalysts, flame-retarding substances, and the like.

In the production of elastomeric plastic materials of a high modulus of elasticity, the polyadducts have up to now preferably been formed in the presence of low molecular aromatic diamines as chain extenders. Since these diamines are carcinogenic, there exist objections of a physiological nature to their use. When employing the compounds according to the invention in the production of elastomeric plastic materials of a high modulus of elasticity, the presence of low molecular aromatic diamines can be omitted.

Suitable polyisocyanates in the production of the polyadducts by means of the new compounds according to the invention are all polyisocyanates known in polyurethane chemistry, such as, for instance, tetramethylene diisocyanate, hexamethylene diisocyanate, 2,4-diisocyanatotoluene, 2,6-diisocyanatotoluene, mixtures of these isomers, 4,4-diisocyanatodiphenyl methane and the like.

As already mentioned, the polyadducts produced employing the compounds according to the invention or obtainable according to the invention are far superior to polyurethanes of corresponding structure due to a number of striking advantages, such as, in particular, stability, thermal stability, abrasion and wear resistance and elasticity.

The production of the compounds of the formula I is explained by means of the following Examples:

EXAMPLE 1

124.8 g (0.1) of a compound of the formula

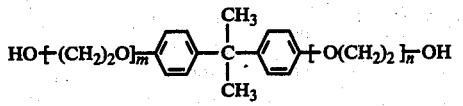

wherein m and n are integers, 35.9 g of isatoic acid anhydride and 2.5 g powdered sodium hydroxide are heated for 3 hours to 80° C. and then for 15 minutes to 100° C. After cooling, 150 ml methylene chloride are added to the mixture and it is filtered. Then, 200 ml water are added to the filtrate and CO₂ is introduced in order to completely remove the sodium hydroxide. This is followed by three extractions with 200 ml water each and concentration in vacuo of the organic phase. The yield obtained amounts to 147.6 g (97% of the theory, which means that 97% of the OH-groups have reacted with the isatoic acid) of a honey-coloured, viscous substance.

Amine titration: for 1.7462 g substance: 23.0 ml, 0.1 n HClO$_4$ in glacial acetic acid.

EXAMPLE 2

145.2 g (0.2 mol) of a compound of the formula

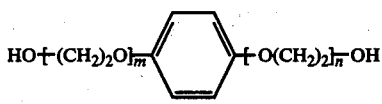

wherein m and n are integers, 71.8 g of isatoic acid anhydride and 3 g powdered sodium hydroxide are reacted and treated as described in Example 1. This procedure yields 177.4 g (92% of the theory) of a honey-coloured, highly viscous substance.

Amine titration: for 1.2561 g substance: 26.1 ml, 0.1 n HClO$_4$ in glacial acetic acid.

EXAMPLE 3

173.6 g (0.1 mol) of a compound of the formula

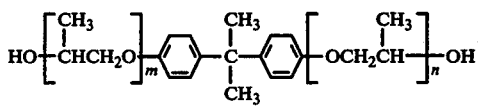

wherein m and n are integers, 35.9 g of isatoic acid anhydride and 2.0 g powdered sodium hydroxide are heated for 4 hours to 75° C. and then for 30 minutes to 100° C. and treated in analogy to Example 1. This procedure yields 187.5 g (95% of the theory) of a honey-coloured, viscous substance.

Amine titration: for 2.6579 g substance: 27.1 ml, 0.1 n HClO$_4$ in glacial acetic acid.

EXAMPLE 4

174.4 g (0.1 mol) of a compound of the formula

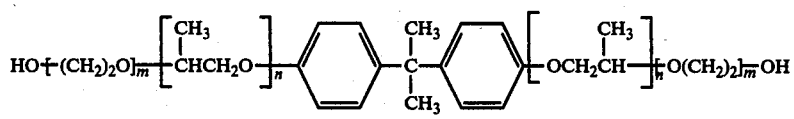

wherein m and n are integers, 35.9 g isatoic acid anhydride and 2.5 g powdered sodium hydroxide are reacted and treated according to Example 1. This procedure yields 180.4 g (91% of the theory) of a honey-coloured, viscous substance.

Amine titration: for 2.4732 g substance: 25.0 ml, 0.1 n HClO$_4$ in glacial acetic acid.

EXAMPLE 5

905 g (0.1 mol) of a compound of the formula

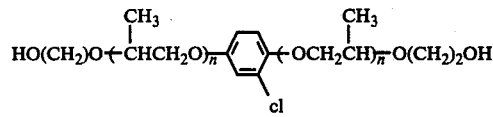

wherein n is an integer, 35.9 g of isatoic acid anhydride and 7 g powdered sodium hydroxide are heated for 4 hours to 80° C. and then for 1 hour to 100° C. and treated in analogy to Example 1. This procedure yields 871 g (95% of the theory) of a honey-coloured, viscous substance.

Amine titration: for 4.8358 g substance: 9.6 ml 0.1 n HClO$_4$ in glacial acetic acid (89% of the theory), which means that 89% of all OH-groups have reacted with isatoic acid anhydride.

EXAMPLE 6

1400 g (0.1 mol) of a compound of the formula

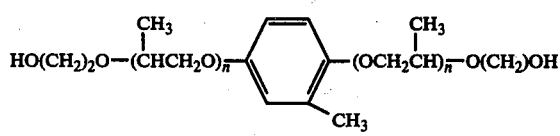

wherein n is an integer, 35.9 g isatoic acid anhydride and 15 g powdered sodium hydroxide are reacted according to Example 5. The yield amounts to 121 g (85% of the theory) of a honey-coloured, viscous substance.

Amine titration: for 7.723 g substance: 9.0 ml 0.1 n HClO$_4$ in glacial acetic acid (83% of the theory), which means that 83% of all OH-groups have reacted with isatoic acid anhydride.

EXAMPLE 7

176 g (0.1 mol) of a compound of the formula

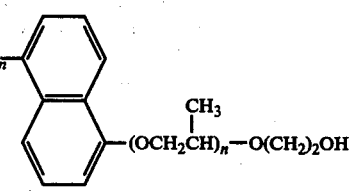

wherein m and n are integers, 35.9 g of isatoic acid anhydride and 5.0 g powdered sodium hydroxide are heated first for 4 hours to 80° C. and then for 1 hour to 100° C. and treated in analogy to Example 1. The yield amounts to 189.5 g (95% of the theory) of a honey-coloured, viscous substance.

Amine titration: for 2.194 g substance: 22 ml, 0.1 n HClO$_4$ in glacial acetic acid.

EXAMPLE 8

139 g (0.1 mol) of a compound of the formula

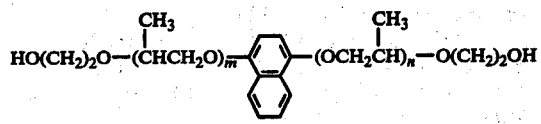

wherein m and n are integers, 35.9 g of isatoic acid anhydride and 5.0 g powdered sodium hydroxide are reacted and treated as described in Example 7. This procedure yields 153.4 g (94% of the thoery) of a honey-coloured, viscous substance.

Amine titration: for 1.7416 g substance: 21.2 ml, 0.1 n $HClO_4$ in glacial acetic acid.

EXAMPLE 9

195.6 g (0.1 mol) of a compound of the formula

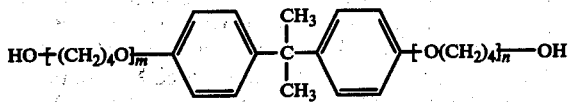

wherein m and n are integers, 35.9 g of isatoic acid anhydride and 3.0 g powdered sodium hydroxide are heated for 3 hours to 75° C. and for 15 minutes to 100° C. After cooling, 150 ml methylene chloride are added to the mixture and it is filtered. Then, 200 ml water are added to the filtrate and $CO_2$ is introduced, in order to completely remove the sodium hydroxide. After three extractions with 200 ml water each, the organic phase is concentrated in vacuo. This procedure yields 194.7 g (93% of the theory) of a honey-coloured, viscous substance.

Amine titration: for 1.8263 g substance: 17.6 ml, 0.1 n $HClO_4$ in glacial acetic acid.

EXAMPLE 10

140.6 g (0.1 mol) of a compound of the formula

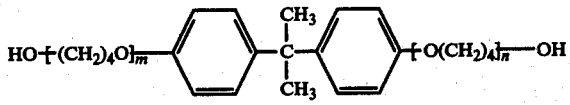

wherein m and n are integers, 35.9 g of isatoic acid anhydride and 2.5 g powdered sodium hydroxide are reacted and treated according to Example 9. This procedure yields 157.8 g (96% of the theory) of a honey-coloured, viscous substance.

Amine titration: for 1.5172 g substance: 18.6 ml, 0.1 n $HClO_4$ in glacial acetic acid.

The following Examples cover the application of the compounds of the formula I:

EXAMPLE 11

152.2 g (0.1 mol) of the diamine produced in Example 1 and 18.5 g toluylene diisocyanate (80% 2,4-isomer, 20% 2,6-isomer) are mixed, poured into a mould and then first heated for 1 hour to 60° C. and then for 24 hours to 100° C. This procedure yields an elastomer of excellent mechanical properties.
Tensile strength: 280 kp $cm^{-2}$
Structural strength: 50 kp $cm^{-1}$
Shore hardness DIN 53505: 60

EXAMPLE 12

192.8 g (0.2 mol) of the diamine produced in Example 2 and 37 g toluylene diisocyanate are heated in a mould first for 30 minutes to 60° C. and then for 24 hours to 100° C. This procedure yields an elastomer of excellent mechanical properties.
Tensile strength: 320 kp $cm^{-2}$
Structural strength: 60 kp $cm^{-1}$
Shore hardness DIN 53505: 75

EXAMPLE 13

197.4 g (0.1 mol) of the diamine produced in Example 3 and 18.5 g toluylene diisocyanate ar heated in a mould first for 30 minutes to 60° C. and then for 24 hours to 100° C. This procedure yields an elastomer of excellent mechanical properties.
Tensile strength: 280 kp $cm^{-2}$
Structural strength: 44 kp $cm^{-1}$
Shore hardness DIN 53505: 82

EXAMPLE 14

130.8 g of the diamine produced in Example 4 are reacted at 60°-70° C. with 18.5 g toluylene diisocyanate. After 15 minutes, the temperature is raised to 90° C. under water jet vacuum. At this temperature, 5.9 g melted 1,4-dichloro-3,5-diaminobenzene are added to the mixture and it is poured into a preheated mould. This procedure yields an elastomer of excellent mechanical properties.
Tensile strength: 310 kp $cm^{-2}$
Structural strength: 45 kp $cm^{-1}$
Shore hardness DIN 53505: 86

EXAMPLE 15

42.5 g (0.245 mol) toluylene diisocyanate (80% 2,4-isomer, 20% 2,6-isomer) are added to 224 g (0.1 mol) of a compound of the formula I which has been produced from 2,2-di(4-hydroxyphenyl)-propane, propylene oxide and isatoic acid anhydride, followed by stirring for 1 hour at 80° C. Then, 26.7 g 1,4-dichloro-3,5-diaminobenzene heated to 120° C. are added and the reaction mixture is poured into a mould. It is heated for 24 hour, whereupon an elastomer of the following properties is obtained:
Tensile strength: 285 kp $cm^{-2}$
Structural strength: 46 kp $cm^{-1}$
Shore hardness DIN 53505: 96

EXAMPLE 16

198.2 g (0.1 mol) of the compound specified in Example 4 to which 61.25 g (0.245 mol) of 4,4-diisocyanato-diphenylmethane have been added are heated under stirring for 1 hour to 80° C. Then, 1,4-dichloro-3,5-diaminobenzene heated to 80° C. is added and the mixture is poured into a mould. After heating for 24 hours, al elastomer of the following properties is obtained:
Tensile strength: 380 kp $cm^{-2}$
Structural strength: 65 kp $cm^{-1}$
Shore hardness DIN 53505: 56

EXAMPLE 17

209.4 g (0.1 mol) of the compound produced according to Example 9 and 18.5 g toluylene diisocyanate (80% 2,4-isomer, 20% 2,6-isomer) are mixed, poured into a mould, and then heated for 30 minutes to 60° C. and for 24 hours to 100° C. This procedure yields an elastomer of the following properties:
Tensile strength: 290 kp cm$^{-2}$
Structural strength: 50 kp cm$^{-1}$
Shore hardness DIN 53505: 76

EXAMPLE 18

164.4 g (0.1 mol) of the compound produced according to Example 10 and 18.5 g toluylene diisocyanate are heated in a mould for 30 minutes to 60° C. and then for 24 hours to 100° C. This yields an elastomer of excellement mechanical properties.
Tensile strength: 300 kp cm$^{-2}$
Structural strength: 56 kp cm$^{-1}$
Shore hardness DIN 53505 80

EXAMPLE 19

138.2 g of the compound produced according to Example 9 are reacted with 18.5 g toluylene diisocyanate at 60°–70° C. After 15 minutes, the temperature is raised to 90° C. under water jet vacuum. At this temperature, 5.9 g melted 1,4-dichloro-3,5-diaminobenzene are added to the mixture and it is poured into a preheated mould. This procedure yields an elastomer of excellent mechanical properties.
Tensile strength: 300 kp cm$^{-2}$
Structural strength: 60 kp cm$^{-1}$
Shore hardness DIN 53505: 72

What we claim is:

1. Novel compounds having terminal amino groups, said novel compounds being of the general formula

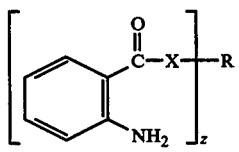  (I)

wherein z is an integer of 2 to 4, X is oxygen or sulfur and R is a group of the formula

  (II)

wherein k stands for an integer of 1 to 4, Ar is an aromatic group, Y when k = 1 is B and when k = 2 to 4 is an alkylidene group having 1 to 5 carbon atoms and B represents a divalent polyalkylene ether group or polyalkylene thioether group such as it is obtained by removal of the hydroxyl or mercapto groups from a polyalkylene ether diol or a polyalkylene thioether dithiol of a molecular weight of about 100 to 15000.

2. A compound according to claim 1, wherein B represents a divalent polyalkylene ether group or polyalkylene thioether group such as it is obtained by removal of the hydroxyl or mercapto groups from a polyalkylene ether diol or a polyalkylene thioether dithiol of a molecular weight of 500 to 3000.

3. A compound according to claim 1, wherein Ar represents a p-phenylene group.

4. A compound according to claim 1, wherein Ar represents a diphenyl alkane group.

5. A compound according to claim 1, wherein Ar represents the diphenyl propane group.

6. A compound according to claim 1, wherein Ar represents a 1,5-naphthalene group or a 1,4-naphthalene group.

7. A compound according to claim 1, wherein B stands for a polyethylene ether group.

8. A compound according to claim 1, wherein B stands for a polypropylene ether group.

9. A compound according to claim 1, wherein B stands for a polyalkylene ether group containing ethylene ether groups and propylene ether groups in any given sequence.

10. A compound according to claim 1, wherein B stands for a group containing ether groups as well as thioether groups.

11. A compound according to claim 1, wherein B stands for a polyalkylene ether group derived from tetrahydrofurane.

12. A compound according to claim 1, wherein B stands for a polyalkylene ether group containing ethylene ether groups and alkylene ether groups derived from tetrahydrofurane, in any given sequence.

13. A compound according to claim 1, wherein B stands for a polyalkylene ether group containing alkylene ether groups derived from tetrahydrofurane, and propylene ether groups, in any given sequence.

14. A compound having terminal amino groups and being of the general formula

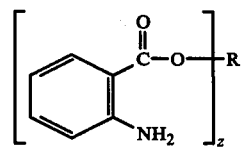  (I)

wherein z is an integer of 2 to 4, and R is a group of the formula

  (II)

wherein k is an integer of 1 to 4;
Ar is aromatic;
when k = 1, Y is B and when k = 2 to 4 then Y is an alkylidene group having 1 to 5 carbon atoms;
B represents divalent polyalkylene ether or polyalkylene thioether such as it is obtained by removal of the hydroxyl or mercapto groups from a polyalkylene etherdiol or a polyalkylene thioether dithiol of a molecular weight of about 100 to 15000.

15. A compound according to claim 14, represented by the formula 1

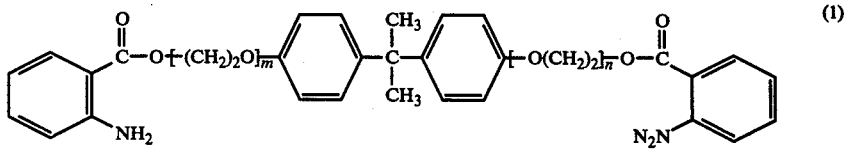  (1)

m and n represent such integers that the molecular weight is about 100 to 15,000.

16. A compound according to claim 14, represented by the formula 2

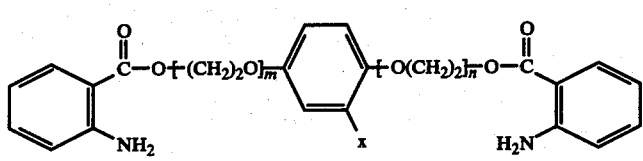

x = H, Halogen, CH₃ m and n represent such integers that the molecular weight is about 100 to 15,000.

17. A compound according to claim 14, represented by the formula 3

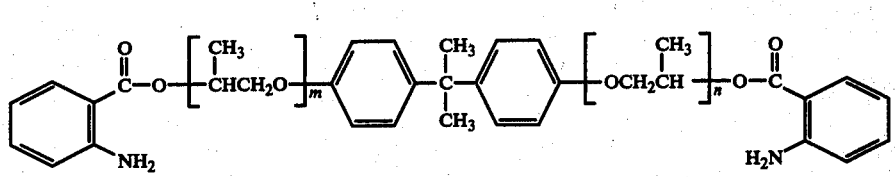

m and n represent such integers that the molecular weight is about 100 to 15,000.

18. A compound according to claim 14, represented by the formula 4

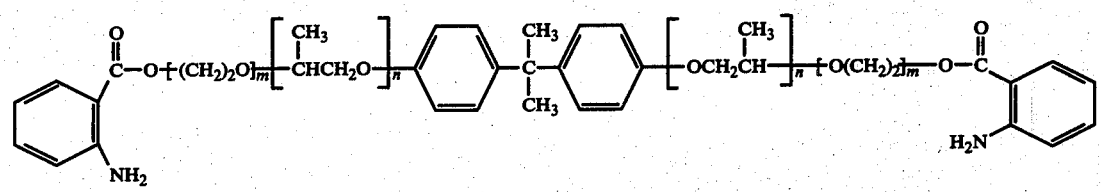

m and n represent such integers that the molecular weight is about 100 to 15,000.

19. A compound according to claim 14, represented by the formula 5

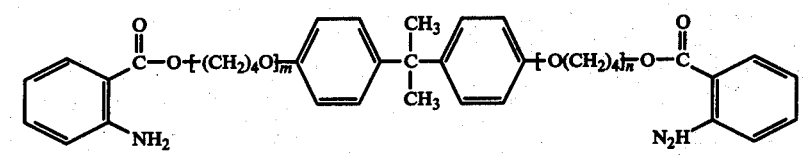

m and n represent such integers that the molecular weight is about 100 to 15,000.

20. A compound according to claim 14, represented by the formula 6

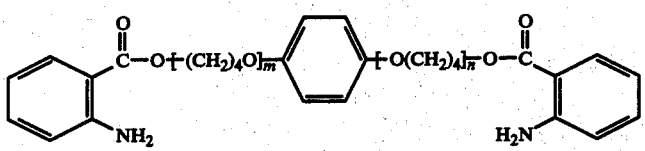

m and n represent such integers that the molecular weight is about 100 to 15,000.

* * * * *